(12) United States Patent
Aliakseyeu et al.

(10) Patent No.: US 12,487,665 B2
(45) Date of Patent: Dec. 2, 2025

(54) RENDERING A VISUAL DISTRACTION FOR A USER LOOKING AT A DISPLAY TOO LONG

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Hendrikus Johan Andrie De Vries, Veldhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/292,402

(22) PCT Filed: Jul. 13, 2022

(86) PCT No.: PCT/EP2022/069584
§ 371 (c)(1),
(2) Date: Jan. 26, 2024

(87) PCT Pub. No.: WO2023/006425
PCT Pub. Date: Feb. 2, 2023

(65) Prior Publication Data
US 2025/0085772 A1    Mar. 13, 2025

(30) Foreign Application Priority Data

Jul. 27, 2021 (EP) ..................................... 21187969

(51) Int. Cl.
*G06F 3/01* (2006.01)
*G06F 3/14* (2006.01)
*G08B 21/24* (2006.01)

(52) U.S. Cl.
CPC ............ *G06F 3/013* (2013.01); *G06F 3/1454* (2013.01); *G08B 21/24* (2013.01)

(58) Field of Classification Search
CPC ...... G06F 3/041–047; G06F 2203/041–04114; G06F 3/013; G06F 3/011; G06F 3/1446; G06F 3/1423; G09G 2300/026
See application file for complete search history.

(56) References Cited

U.S. PATENT DOCUMENTS

| | | | |
|---|---|---|---|
| 2008/0259098 A1* | 10/2008 | Zamorsky | G09F 19/12 345/204 |
| 2012/0092172 A1 | 4/2012 | Wong et al. | |
| 2014/0022159 A1* | 1/2014 | Leigh | G06F 3/017 345/156 |
| 2015/0199003 A1 | 7/2015 | Zhang et al. | |
| 2015/0379716 A1 | 12/2015 | Peng et al. | |
| 2016/0054794 A1 | 2/2016 | Yu | |
| 2017/0345393 A1 | 11/2017 | Wu et al. | |
| 2021/0082371 A1* | 3/2021 | Novelli | G09G 5/10 |

* cited by examiner

*Primary Examiner* — Sanjiv D. Patel

(57) ABSTRACT

A system is configured to determine whether a user has been looking at a display (15) longer than a predefined period of time, determine a first location of a device (14) which comprises the display, determine second locations of a plurality of further devices (31-33), select a further device (32) from the plurality of further devices based on the first location and the second locations, and control the selected further device to render a visual distraction if the user is determined to have been looking at the display longer than the predefined period of time.

14 Claims, 6 Drawing Sheets

RENDERING A VISUAL DISTRACTION FOR A USER LOOKING AT A DISPLAY TOO LONG

CROSS-REFERENCE TO PRIOR APPLICATIONS

This application is the U.S. National Phase application under 35 U.S.C. § 371 of International Application No. PCT/EP2022/069584, filed on Jul. 13, 2022, which claims the benefit of European Patent Application No. 21187969.7, filed on Jul. 27, 2021. These applications are hereby incorporated by reference herein.

FIELD OF THE INVENTION

The invention relates to a system for determining whether a user has been looking at a display longer than a predefined period of time.

The invention further relates to a method of determining whether a user has been looking at a display longer than a predefined period of time.

The invention also relates to a computer program product enabling a computer system to perform such a method.

BACKGROUND OF THE INVENTION

Many office workers spend the whole day in front of the screen and when they get back home, they continue to use displays, e.g., of TV, tablets, and phones. Focusing on close objects such as a computer display is known to cause near-sightedness (myopia). To avoid myopia, health specialists recommend scheduling frequent breaks away from the display, and to frequently relax eyes by focusing on a distant object.

However, while most people are aware of the health risks associated with continuous staring at the screen, many people do not take the desired breaks. US 2016/0054794 A1 discloses a solution to this problem in the form of an eye-control reminding method which includes detecting information related to an eye of a user in real time, comparing the information related to an eye of the user with a preset value, and determining eye-in-use status of the user according to the comparison result. When the comparison result is a set status, the user is reminded to protect his eyes. However, many users ignore this reminder.

SUMMARY OF THE INVENTION

It is a first object of the invention to provide a system, which can help users take breaks away from the display.

It is a second object of the invention to provide a method, which can be used to help users take breaks away from the display.

In a first aspect of the invention, a system for determining whether a user has been looking at a display longer than a predefined period of time comprises at least one input interface, at least one transmitter, and at least one processor configured to determine, via said at least one input interface, whether said user has been looking at said display longer than said predefined period of time, obtain location information indicative of a location of a device which comprises said display and locations of a plurality of further devices, determine a first location of said device which comprises said display based on said location information, determine second locations of said plurality of further devices based on said location information, select a further device from said plurality of further devices based on said first location and said second locations, and control, via said at least one transmitter, said selected further device to render a visual distraction if said user is determined to have been looking at said display longer than said predefined period of time.

By rendering a visual distraction remote from the display if the user is determined to have been looking at the display too long, the user is more likely to take a break from the display. Having the user focus on this distant visual distraction results in a higher health benefit. Furthermore, rendering a visual distraction remote from the display makes it possible to avoid displaying notifications on the display, which some users find annoying.

The visual distraction may be rendered if a distance threshold (to the display) and a posture or gaze time threshold is met, for example. Said selected further device may be a lighting device, may comprise a remote display, may be a projection device, or may comprise daylight blocking means, for example. The visual distraction may be rendered, for example, by controlling a lighting device to switch off or turn off its light source(s). For instance, in an office environment, light switching off in the distance can be as distracting as a dynamic light effect. The daylight blocking means may comprise blinds or a switchable/smart glass device, for example. The lighting device may be a connected (pixelated) luminaire or light source, for example. The visual distraction may be 'gamified'. For example, the user may be asked to report the occurrence of a target or particular effect.

The display may be part of a mixed reality device (virtual reality combined with augmented reality) where a user may be immersed in content rendered on a short focus distance. The further device may be selected before or after it has been determined that said user has been looking at said display longer than said predefined period of time. In the former case, the further device may be selected during a configuration action, for example. Said at least one processor may be configured to augment said visual distraction with an auditory effect and/or a haptic effect.

Said at least one processor may be configured to determine whether said user has been looking at said display longer than said predefined period of time by determining whether said user has gazed at said display longer than said predefined period of time, has held the same posture longer than said predefined period of time, and/or has interacted with a system displaying content on said display longer than said predefined period of time, for example. The predefined period of time may be based on a default setting, a user profile (e.g., age), or user-defined settings, for example. The predefined period of time may also be made dependent on a cumulative daily time spent watching the display (or any display), or on the length of the display session, for example. When determining whether the user has been looking at the display longer than the predefined period of time, small interruptions, e.g. microbreaks or saccades, are preferably ignored. For example, if the user works for 30 minutes non-stop with occasional saccades away from the screen, it should preferably still count as 30 minutes.

Said at least one processor may be configured to select said further device from said plurality of further devices by selecting a further device which has a location with at least a minimum distance to said first location, said location being included in said second locations. An example of the minimum distance is eight meters. The minimum distance may be used to make sure that the visual distraction is indeed rendered by a distant further device and the user indeed relaxes his eyes (sufficiently).

Said at least one processor may be configured to select said further device from said plurality of further devices by selecting a further device which has a location with a larger distance to said first location than other ones of said plurality of further devices, said location being included in said second locations. By rendering the visual distraction as far away as possible from the user (but still visible to the user), the chances of the user relaxing his eyes are maximized. The at least one processor may be configured to select a non-distant device if no distant device is available.

Said at least one processor may be configured to select said further device in dependence on said further device being in the field of view of said user or illuminating an object in the field of view of said user. This may be used to ensure that the visual distraction is visible to the user. For example, a lamp may itself be in the user's field of view or the lamp may be (just) outside the user's field of view (e.g., a recessed spotlight) but illuminate an object (e.g., decorative object, artwork) in the user's field of view. Such information may be retrieved from a Building Information Model or could be detected by a smart device of the user (e.g., smart glasses). Illuminating an object may comprise projecting a light pattern (or display content) on a (projection) surface.

Said at least one processor may be configured to determine a start time for rendering said visual distraction to coincide with a transition in content displayed on said display, with a time at which another system starts rendering an own visual distraction, with a time at which rendering said visual distraction would not distract another user, or with a detected event. As an example of the former, the visual distraction may be rendered upon finishing an e-mail, or at the end of a video (chapter), or at a quiet moment in the content. By determining the start time to coincide with a time at which another system starts rendering an own visual distraction, the visual breaks among colleagues in a space may be synced. This may stimulate colleagues for social interaction, or taking a coffee break together, for instance. A camera (e.g., in the environment or on wearable smart glasses) may be used to detect an event that is worthwhile to look at during the "visual break", in particular an event near/or in same direction as the selected further device. An example of such an event is a celebration.

Said selected further device may comprise a further display and said at least one processor may be configured to control said selected further device to display, on said further display, a copy of content displayed on said display. This may help attract the user's attention, and in addition, it could help the user to continue watching the content at a different focus distance, thereby reducing the eye strain for the user. The further display may, but does not need to, display an exact copy of all content displayed on the display. A more distant display device may require the display content to be processed or adjusted to be properly visible on its display. In this case, an exact copy of all content displayed on the display may be slightly adjusted to suit the more distant display's properties and its relative viewing position.

Said at least one processor may be configured to cause said display to render an animation which moves in the direction of said selected further device. This may be used to guide the user's visual attention in that direction. If the selected further device comprises a further display, the animation could continue or "arrive" on this distant display.

Said at least one processor may be configured to cause an adjustment to a displaying of content on said display during said visual distraction. This may help cause the user to focus on the visual distraction.

Said at least one processor may be configured to cause said adjustment to said displaying of said content by causing said displaying to be stopped or paused or slowed, and/or by causing said content to be displayed with a reduced brightness. This may be used to provide time for the user to take the "focus break". The adjustment may be caused upon controlling said selected further device to render a visual distraction or upon detecting that the user is actually focusing on the selected further device. By stopping or pausing the displaying, a change of focus is forced. By reducing brightness, a change of focus is gently suggested.

Said at least one processor may be configured to determine for each of said plurality of devices whether rendering said visual distraction would be visible to another user and select said further device from said plurality of further devices based on said determined visibility to another user. When rendering the visual distraction, other users (e.g., in the same room) may also need to be taken into account, e.g., by ensuring that the visual distraction is not in the view of users who should not be affected, or by synchronizing visual distractions such that multiple users are being distracted at the same time. For example, the number of other uses able to see the visual distraction may be minimized.

Said at least one processor may be configured to detect a response of said user to said visual distraction and if no response is detected, control said selected further device to make said visual distraction more prominent, control a second further device of said plurality of further devices to render a further visual distraction, and/or cause an adjustment to a displaying of content on said display during said visual distraction. For example, the visual distraction may be made more prominent (e.g., multi-modal) if no response is detected.

In a second aspect of the invention, a method of determining whether a user has been looking at a display longer than a predefined period of time comprises determining whether said user has been looking at said display longer than said predefined period of time, obtaining location information indicative of a location of a device which comprises said display and locations of a plurality of further devices, determining a first location of said device which comprises said display based on said location information, determining second locations of said plurality of further devices based on said location information, selecting a further device from said plurality of further devices based on said first location and said second locations, and controlling said selected further device to render a visual distraction if said user is determined to have been looking at said display longer than said predefined period of time. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining whether a user has been looking at a display longer than a predefined period of time.

The executable operations comprise determining whether said user has been looking at said display longer than said predefined period of time, determining a first location of a device which comprises said display, determining second locations of a plurality of further devices, selecting a further device from said plurality of further devices based on said first location and said second locations, and controlling said selected further device to render a visual distraction if said user is determined to have been looking at said display longer than said predefined period of time.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
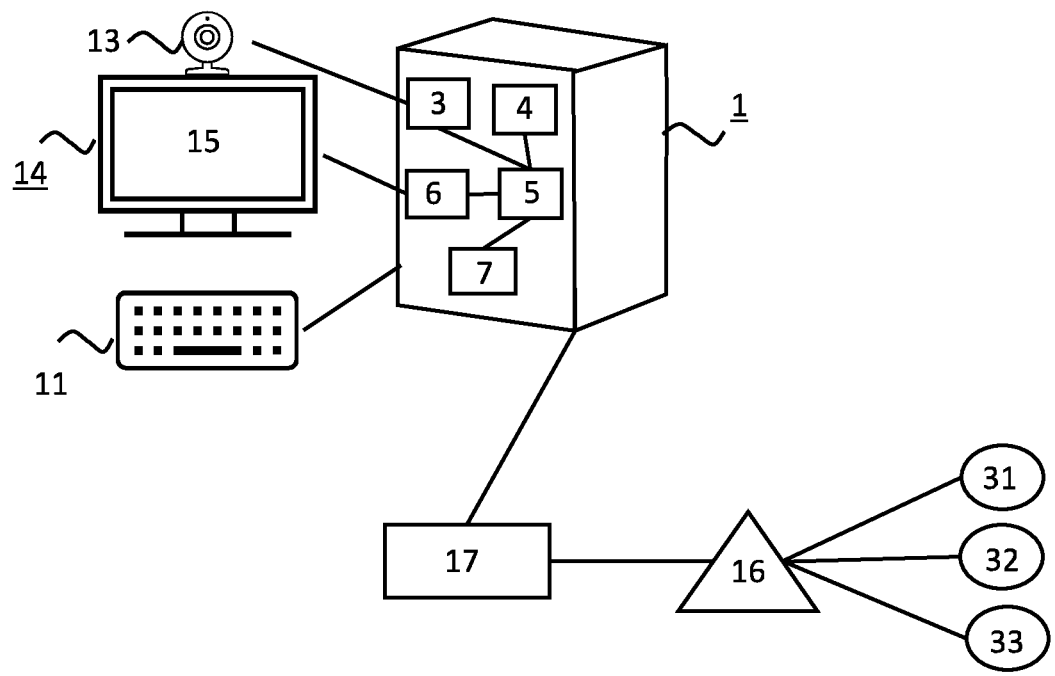
FIG. 1 is a block diagram of a first embodiment of the system.

FIG. 1 shows a first embodiment of the system for determining whether a user has been looking at a display longer than a predefined period of time. In this first embodiment, the system is a computer 1. A display device 14 is connected to the computer 1. The display device 14 comprises a display 15. A camera 13 is physically attached to the display device 14 and connected to the computer 1. In other examples, if a camera is used, the camera may be embedded in the computer or may not be in front of the user and/or this close to the user. A keyboard 1 is also connected to the computer 1. The computer 1 may be a desktop computer or laptop computer, for example. Alternatively, the system may be a tablet, a mobile phone, or a monitor, for example.

The computer 1 is connected to wireless LAN access point 17, e.g., via Wi-Fi or Ethernet. A light controller 16 is also connected to the wireless LAN access point 17, e.g., via Wi-Fi or Ethernet. Three lighting devices 31-33 can be controlled via the light controller 16, e.g., using Zigbee technology. The light controller 16 may be a Philips Hue bridge, for example.

The computer 1 comprises a receiver 3, a transmitter 4, a processor 5, a display interface 6, and storage means 7. The computer 1 uses the display interface 6 to display images/video on the display 15 of display device 14. The processor 5 is configured to determine, based on images received via the receiver 3 from camera 13, whether the user has been looking at the display longer than the predefined period of time, determine a first location of display device 14 which comprises the display 15, and determine second locations of a plurality of further devices. The first and second locations may be determined automatically or may be determined based on user input, for example.

The processor 5 may be configured to obtain location information indicative of a location of the device 14 which comprises the display 15 and locations of the plurality of further devices 31-33 such as the lighting devices 31-33. The processor 5 may be configured to obtain the location information from a memory (which may be comprised in the computer 1, or be located remotely accessible via a network). The location information may for example have been provided by a user via a user interface, or the location information may have been provided by an (indoor) positioning system. The processor 5 may be configured to obtain the location information via the at least one input interface. Techniques for determining the locations of devices and communicating those to a system are known in the art and will therefore not be discussed in further detail.

In the example of FIG. 1, the locations of lighting devices 31-33 are determined. Instead of determining the location of display device 14 precisely, the location of computer 1 may first be determined and the location of display device 14 may be assumed to be the same as the location of computer 1.

The processor 5 is further configured to select a further device from the plurality of further devices based on the first location and the second locations, and control, via the transmitter 4, the selected further device to render a visual distraction if the user is determined to have been looking at the display longer than the predefined period of time. In the example of FIG. 1, the selected further device is one of lighting devices 31-33. In another example, the selected further device may comprise a further display or may comprise blinds, for example.

In the embodiment of the computer 1 shown in FIG. 1, the computer 1 comprises one processor 5. In an alternative embodiment, the computer 1 comprises multiple processors. The processor 5 of the computer 1 may be a general-purpose processor, e.g., from Intel or AMD, or an application-specific processor. The processor 5 of the computer 1 may run a Windows or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired or wireless communication technologies, e.g. Ethernet or Wi-Fi for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computer 1 may comprise other components typical for a computer such as a power connector. The invention may be implemented using a computer program running on one or more processors.

In the embodiment of FIG. 1, the computer 1 receives data from and transmits data to the lighting devices 31-33 via the bridge 16. In an alternative embodiment, the computer 1 receives data from and transmits data to one or more of the lighting devices 31-33 without a bridge.

Figure 2:
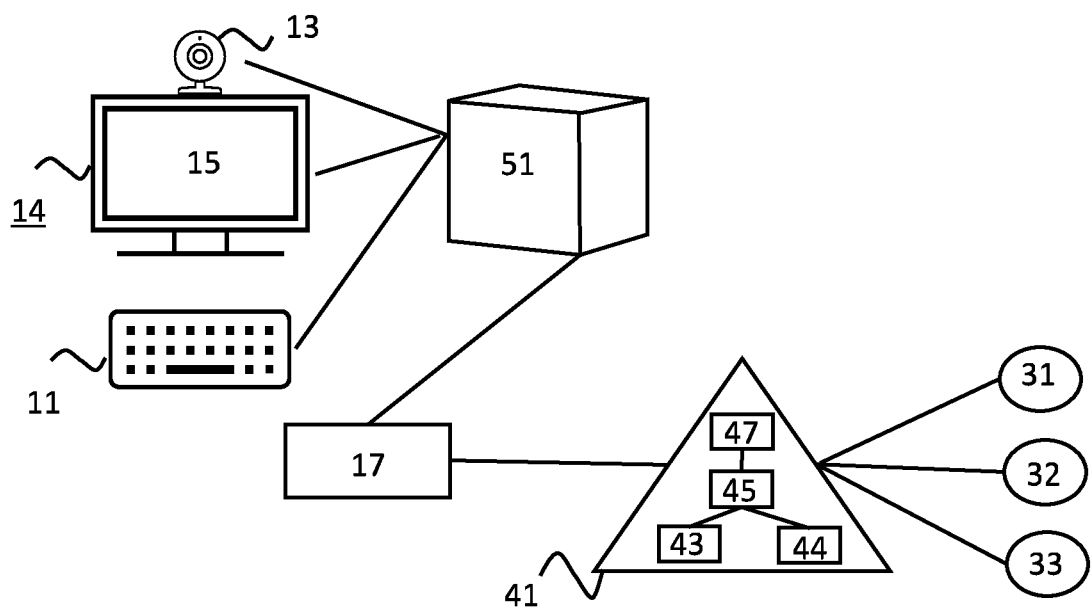
FIG. 2 is a block diagram of a second embodiment of the system.

FIG. 2 shows a second embodiment of the system for determining whether a user has been looking at a display longer than a predefined period of time. In this second embodiment, the system is a light controller 41. In the example of FIG. 2, the display device 14 is connected to a computer 51. Although it is the light controller 41 which controls the lighting devices 31-33 in this embodiment, the camera 13 is still connected to the computer, i.e., computer 51 in FIG. 2. Alternatively, the camera 13 may be able to communicate directly with the light controller 41, for example.

The light controller 41 comprises a receiver 43, a transmitter 44, a processor 45, and a memory 47. The processor 45 is configured to determine, via the receiver 43 and computer 51, whether the user has been looking at the display longer than the predefined period of time, determine a first location of display device 14 which comprises the display 15, and determine second locations of a plurality of further devices.

In the example of FIG. 2, the computer 51 may determine whether the user has gazed at the display longer than the predefined period of time and/or has held the same posture longer than the predefined period of time and communicate this to the light controller 41. Additionally or alternatively, the computer 51 may determine whether the user has interacted with a system displaying content on the display longer than the predefined period of time, for example. If only the latter is determined, then camera 13 may be omitted.

The processor 45 is further configured to select a further device from the plurality of further devices based on the first location and the second locations, and control, via the transmitter 44, the selected further device to render a visual distraction if the user is determined to have been looking at the display longer than the predefined period of time. In the example of FIG. 1, the selected further device is one of lighting devices 31-33.

In the embodiment of the light controller 41 shown in FIG. 2, the light controller 41 comprises one processor 45. In an alternative embodiment, the light controller 41 comprises multiple processors. The processor 45 of the light controller 41 may be a general-purpose processor, e.g. ARM-based, or an application-specific processor. The processor 45 of the light controller 41 may run a Unix-based operating system for example. The memory 47 may comprise one or more memory units. The memory 47 may comprise solid-state memory, for example. The memory 47 may be used to store a table of connected lights, for example.

The receiver 43 and the transmitter 44 may use one or more wired or wireless communication technologies, e.g. Ethernet or Wi-Fi for communicating with the wireless LAN access point 17 and Zigbee for communicating with the lighting devices 31-33, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The light controller 41 may comprise other components typical for a controller device such as a power connector. The invention may be implemented using a computer program running on one or more processors.

In the embodiments of FIGS. 1 and 2, the system of the invention comprises a single device. In an alternative embodiment, the system of the invention comprises a plurality of devices.

Figure 3:
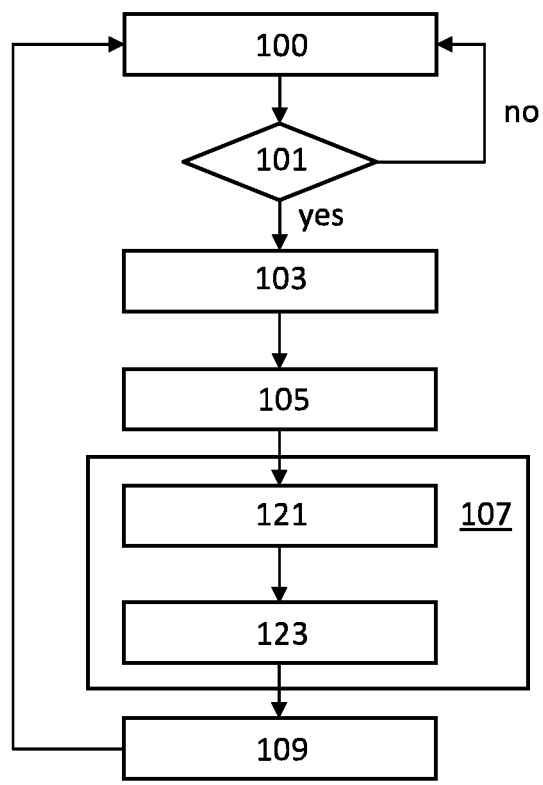
FIG. 3 is a flow diagram of a first embodiment of the method.

A first embodiment of the method of determining whether a user has been looking at a display longer than a predefined period of time is shown in FIG. 3. The method may be performed by the computer 1 of FIG. 1 or the light controller 41 of FIG. 2, for example. The method may be used in office and/or home environments, for example.

A step 100 comprises determining how long the user has been looking at the display. A step 101 comprises determining whether the user has been looking at the display longer than the predefined period of time. Step 101 may comprise determining whether the user has gazed at the display longer than the predefined period of time, has held the same posture longer than the predefined period of time, and/or has interacted with a system displaying content on the display longer than the predefined period of time, for example.

Gaze detection and or head movement may be performed by a (e.g., display-integrated) camera or a wearable device, for example. In office environments, environmentally integrated sensor bundles may be used. The activity on the device (e.g., typing) may also be used an indication of a prolonged gaze and a program running on the device, a microphone or a camera may be used to detect it. Sensors in the chair or environmental posture or motion sensors may also be used to estimate the user's posture over time, which may be indicative of a prolonged gaze.

If it is determined in step 101 that the user has been looking at the display longer than the predefined period of time, step 103 is performed next. Otherwise, step 100 is repeated, and the method proceeds as shown in FIG. 3.

A step 103 comprises determining a first location of a device which comprises the display. A step 105 comprises determining second locations of a plurality of further devices. A step 107 comprises selecting a further device from the plurality of further devices based on the first location determined in step 103 and the second locations determined in step 105. The selected further device may be a lighting device, may comprise a further display, may be a projection device, or may comprise daylight blocking means like blinds, for example.

In the embodiment steps 103, 105, and 107 are performed each time it is determined in step 101 that the user has been looking at the display longer than the predefined period of time. In an alternative embodiment, steps 103, 105, and 107 are performed before step 101 or (partly) in parallel with step 101. In this alternative embodiment, steps 103, 105, and 107 may be performed when setting up the system and whenever devices are added or removed from the system or moved to another location, for example.

In the embodiment of FIG. 3, step 107 is implemented by steps 121 and 123. Step 121 comprises filtering a list of further devices such that only devices in the field of view of the user (or illuminating an object in the field of view of the user) are left. Step 123 comprises selecting from this list a further device which has a location with at least a minimum distance, e.g., 5 meters, to the first location.

Possibly, information is retrieved from a building information model in order to perform steps 121 and 123. Alternatively, a user (e.g., an administrator) may use a user interface to place icons representing the display and the plurality of further devices in a visual representation of a room and rotate the icons if applicable (this is normally not necessary for lighting devices that transmit light in all directions). Alternatively, locations of devices may be determined automatically, e.g., by using RF beacons. In the latter case, the orientations of devices may be detected automatically or may be specified by the user, for example.

In an office environment, the system that performs the method might also make sure that when rendering the notification, it will not distract other office users. The selected further device could be a light in the opposite corner of an open office, or in the case of a home environment, a light in a different (preferably unoccupied) room that might be still visible through a door, or a light in the garden which can be seen through a window or door opening. Instead of a light, the selected further device may be an information display, as often used in an office environment, for example.

Figure 4:
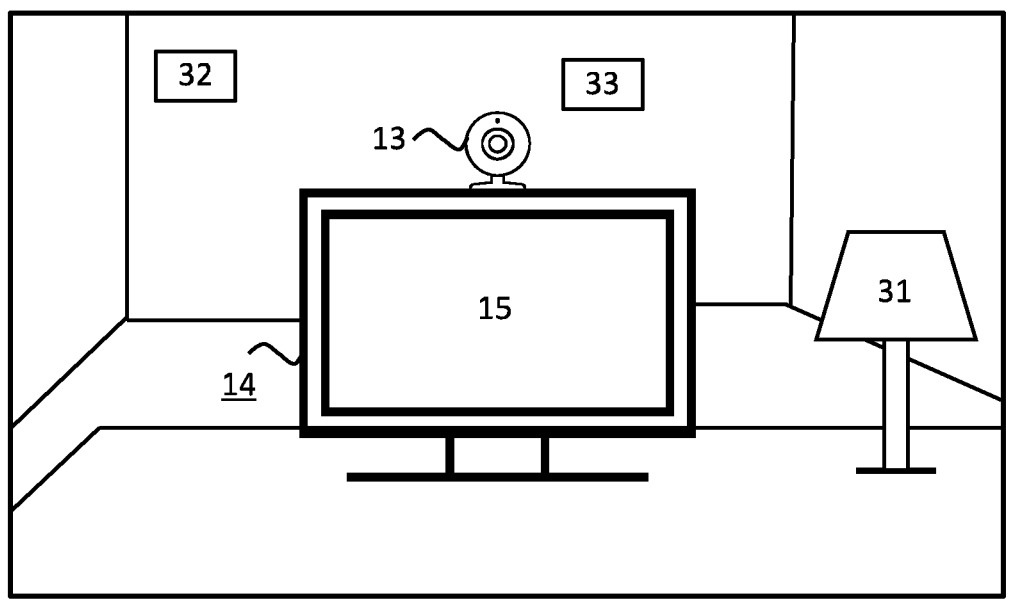
FIG. 4 shows an example of a display and examples of further devices that may be controlled to render a visual distraction.

FIG. 4 shows an example of a display, display 15 of FIGS. 1 and 2, and examples of further devices, lighting devices 31-33 of FIGS. 1 and 2, from which a further device may be selected in steps 121 and 123. Like in FIGS. 1 and 2, display 15 is part of a display device 14 and camera 13 is used to determine whether the user has been looking at the display longer than the predefined period of time.

Lighting devices 31-33 are all within the field of view of the user and are therefore all included in the filtered list that results from step 121. If the room comprises lighting devices behind the user, these are not included in the filtered list that results from step 121. Lighting device 31 does not have a location with at least the minimum distance and is therefore not selected in step 123. Both lighting devices 32 and 33 have a location with at least the minimum distance. In the embodiment of FIG. 3, either lighting device 32 or lighting device 33 may be selected in step 107.

A step 109 comprises controlling the further device selected in step 107 to render a visual distraction. The type of notification may depend on the type of the selected further device. For example, if the selected further device is a lighting device, the visual distraction may be in the form of a change in color or brightness. This change may be dynamic, e.g., a pulsating color. If the selected further device is a display device, the visual distraction may be rendered by displaying contrasting and dynamic images/video. The remote display device may also render an instruction, in the form of text, e.g., "look out of the window and focus on a distant object" or in the form of known icons.

The visual distraction may be a pixelated light effect, or a dynamic effect generated on an artificial skylight or virtual window. For instance, a display-based virtual skylight window may normally render a (mostly) static image of a sky and an airplane or flock of birds may then be rendered on the skylight's display as a visual distraction. Corresponding sounds may also be generated. When rendering the visual distraction, other users (e.g., in the same room) may also need to be taken into account, e.g., by ensuring that the visual distraction is not in the view of users who should not be affected, or by synchronizing visual distractions such that multiple users are being distracted at the same time. The visual distraction is only rendered temporary, e.g., for a few minutes or less.

Figure 5:
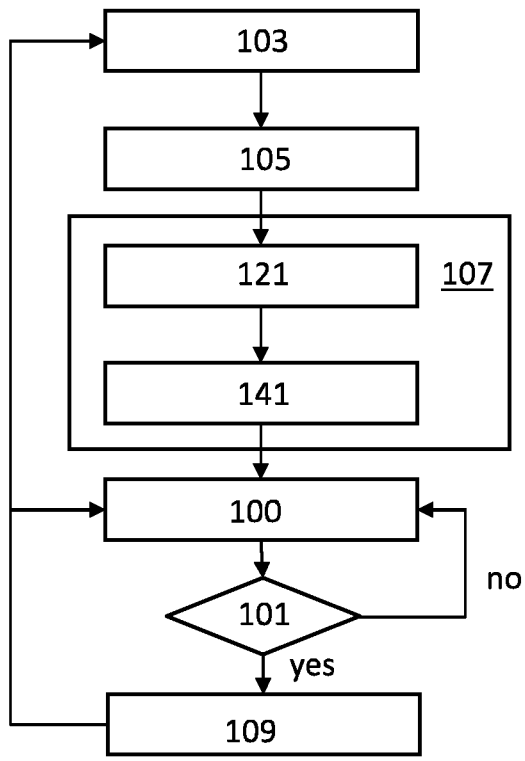
FIG. 5 is a flow diagram of a second embodiment of the method.

A second embodiment of the method of determining whether a user has been looking at a display longer than a predefined period of time is shown in FIG. 5. The method may be performed by the computer 1 of FIG. 1 or the light controller 41 of FIG. 2, for example. The embodiment of FIG. 5 is a variant on the embodiment of FIG. 3. In the embodiment of FIG. 5, steps 103, 105, and 107 are performed before step 101. Steps 103, 105, and 107 may be performed when setting up the system and whenever devices are added or removed from the system or moved to another location, for example.

In the embodiment of FIG. 5, step 107 is implemented by steps 121 and 141. As described above, step 121 comprises filtering a list of further devices such that only devices in the field of view of the user (or illuminating an object in the field of view of the user) are left. Step 141 comprises selecting from this list a further device which has a location with a larger distance to the first location than other ones of the plurality of further devices. In the embodiment of FIG. 5, lighting device 32 of the example of FIG. 4 would be selected in step 107, as lighting device 32 has a larger distance to the display device 14 than lighting device 33 in the example of FIG. 4.

Figure 6:
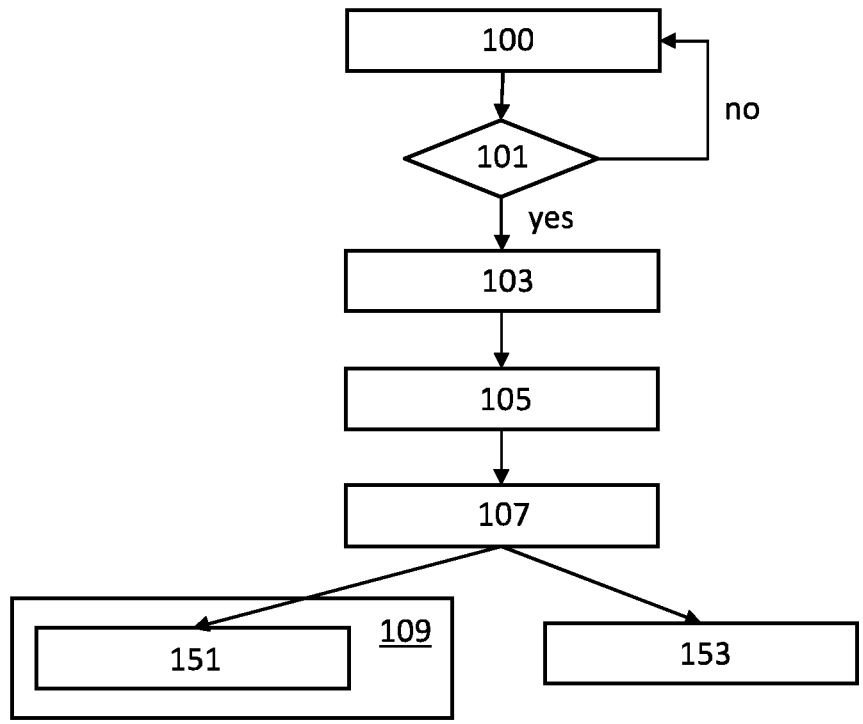
FIG. 6 is a flow diagram of a third embodiment of the method.

A third embodiment of the method of determining whether a user has been looking at a display longer than a predefined period of time is shown in FIG. 6. The method may be performed by the computer 1 of FIG. 1 or the light controller 41 of FIG. 2, for example. The embodiment of FIG. 6 is a variant on the embodiment of FIG. 3. In the embodiment of FIG. 6 (and in the embodiments of FIGS. 7-9 and 11), step 107 may be implemented by steps 121 and 123 of FIG. 3, by steps 121 and 141 of FIG. 5, or in a different way.

In the embodiment of FIG. 6, step 109 of FIG. 3 comprises a step 151 and a step 153 is also performed after step 107. Step 151 is performed if the further device selected in step 107 comprises a further display. Step 151 comprises controlling the selected further device to display, on the further display, a copy of content displayed on the display. For example, the visual content stream (e.g., video) that the user is watching on a smartphone may be copied to a larger, remote TV screen, enabling the user to continue watching the content at another focal distance.

Step 153 comprises causing the display to render an animation which moves in the direction of the selected further device. Steps 151 and 153 are preferably performed in parallel. To improve detectability, the visual distraction might start on the display of the user and 'move'/disappear from the screen to the selected further device, triggering the user to look or search for the visual distraction rendered on the selected further device.

Figure 7:
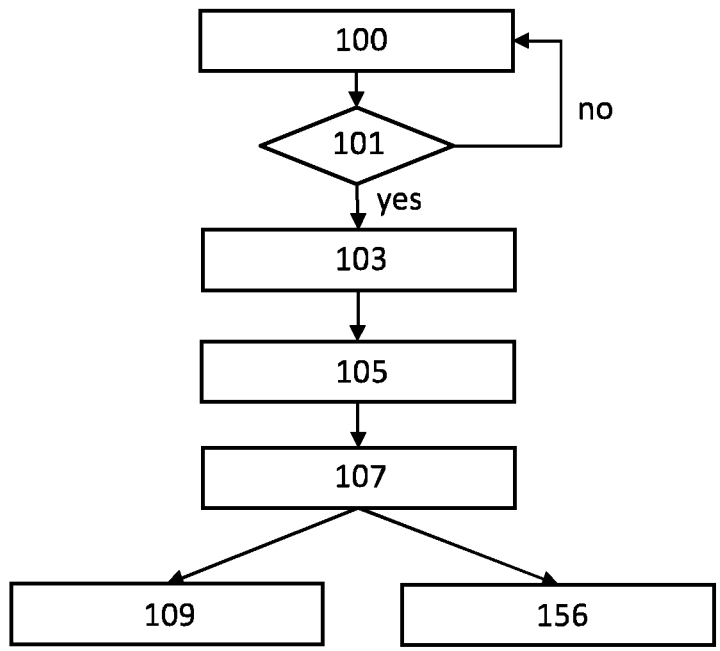
FIG. 7 is a flow diagram of a fourth embodiment of the method.

A fourth embodiment of the method of determining whether a user has been looking at a display longer than a predefined period of time is shown in FIG. 7. The method may be performed by the computer 1 of FIG. 1 or the light controller 41 of FIG. 2, for example. The embodiment of FIG. 7 is a variant on the embodiment of FIG. 3. In the embodiment of FIG. 7, a step 156 is performed after step 107 in addition to step 109.

Step 156 comprises causing an adjustment to a displaying of content on the display during the visual distraction. This adjustment may be caused by causing the displaying to be stopped or paused or slowed, and/or by causing the content to be displayed with a reduced brightness, for example.

Figure 8:
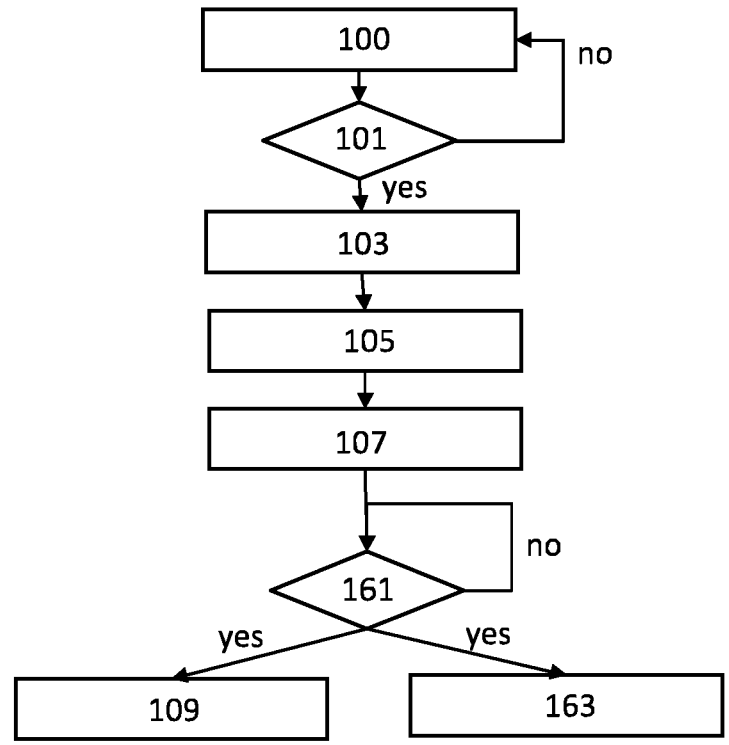
FIG. 8 is a flow diagram of a fifth embodiment of the method.

A fifth embodiment of the method of determining whether a user has been looking at a display longer than a predefined period of time is shown in FIG. 8. The method may be performed by the computer 1 of FIG. 1 or the light controller 41 of FIG. 2, for example. The embodiment of FIG. 8 is a variant on the embodiment of FIG. 3. In the embodiment of FIG. 8, a step 161 is performed between steps 107 and 109 and a step 163 is also performed after step 161, in addition to step 109.

Step 161 comprises determining whether it is time to start rendering the visual distraction. At one or more occasions, it is time to start rendering the visual distraction if the visual distraction will then coincide with a transition in content displayed on the display, with a time at which another system starts rendering an own visual distraction, with a time at which rendering said visual distraction would not distract another user, or with a detected event. Step 163 comprises augmenting the visual distraction with an auditory effect and/or a haptic effect. For example, the sound of an airplane may be rendered by a speaker alongside images of an airplane rendered on a display-based skylight.

Figure 9:
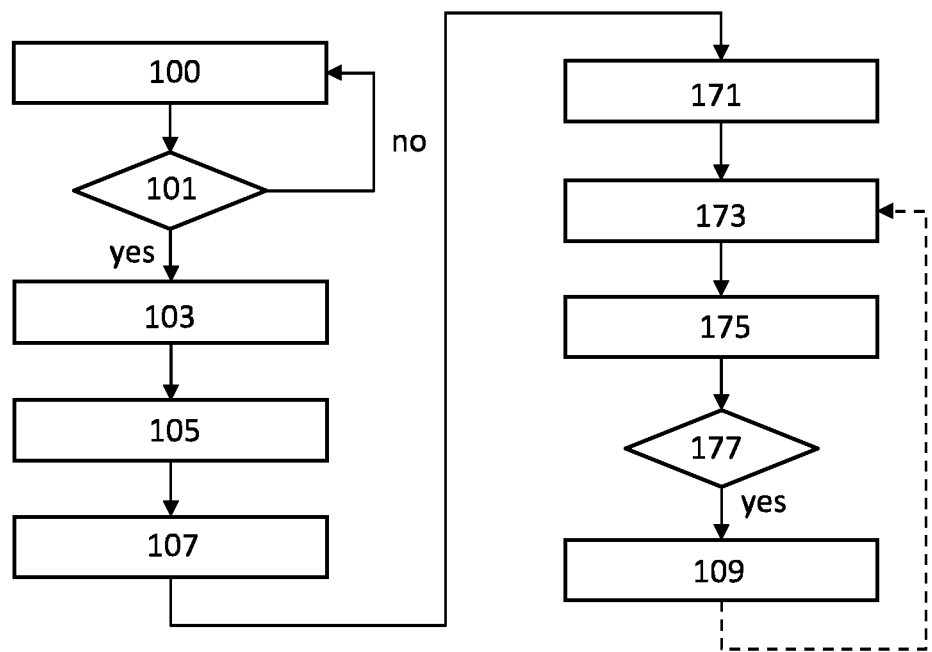
FIG. 9 is a flow diagram of a sixth embodiment of the method.

A sixth embodiment of the method of determining whether a user has been looking at a display longer than a predefined period of time is shown in FIG. 9. The method may be performed by the computer 1 of FIG. 1 or the light controller 41 of FIG. 2, for example. The embodiment of FIG. 9 is a variant on the embodiment of FIG. 3. In the embodiment of FIG. 9, steps 171, 173, 175 and 177 are performed between steps 107 and 109.

In the embodiment of FIG. 9, the system that performs the method first selects a further device that is closer to the display (and therefore the user) in step 171 and controls this closer further device to render a first visual distraction in step 173. The closer further device selected in step 171 should not be far from the more distant further device selected in step 107 in terms of angular "distance".

Figure 10:
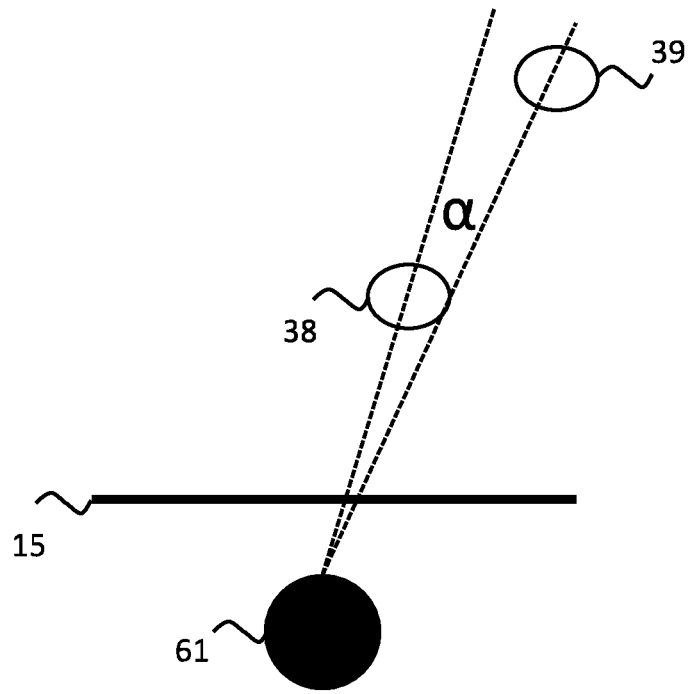
FIG. 10 shows an example of an angular distance between two further devices that may be controlled to render a visual distraction.

FIG. 10 shows an example of an angular distance between a nearby further device and a distant further device. A person 61 is looking at a display 15 and lighting devices 38 and 39 are in the user's field of view when the user is looking at the display 15. The lighting device 38 is relatively close to the display 15 (e.g., distance smaller than a threshold T1) and the lighting device 39 is relatively distant from the display 15 (e.g., distance larger than a threshold T2). The angular "distance" α should be small, e.g., smaller than a threshold T3.

Step 175 comprises detecting a response of the user to the visual distraction. Similar techniques may be used in step 175 as in step 100. Step 177 comprises checking whether a response has been detected in step 175. If a response has been detected, i.e., the system detects a change in the user's attention, step 109 is performed, and the more distant further device selected in step 107 is controlled to render a second visual distraction. Optionally, step 173 is repeated after step 109.

Thus, in the embodiment of FIG. 9, the visual distraction is first rendered on a separate, nearby device to get attention and then on the distant device to ensure eye relaxation.

Figure 11:
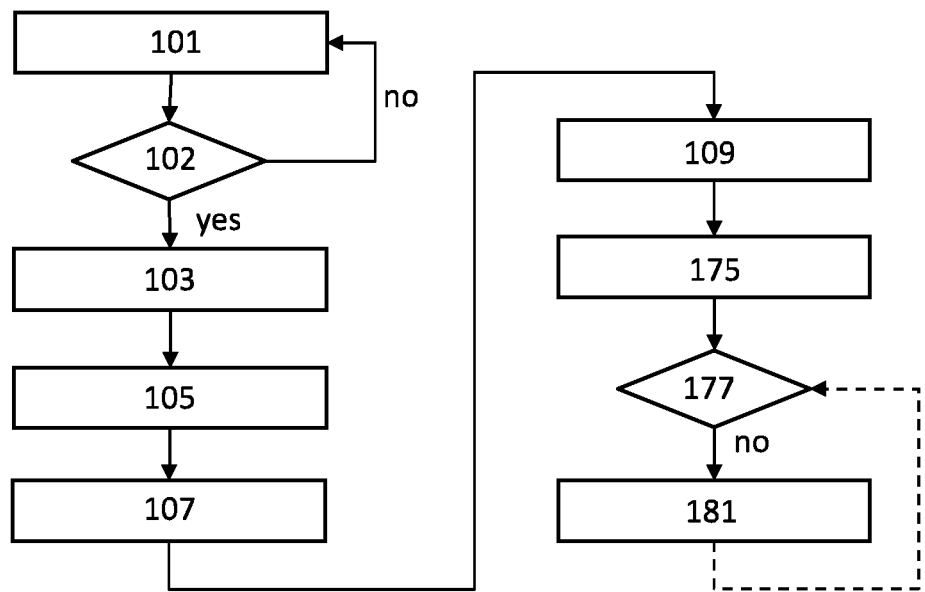
FIG. 11 is a flow diagram of a seventh embodiment of the method.

A seventh embodiment of the method of determining whether a user has been looking at a display longer than a predefined period of time is shown in FIG. 11. The method may be performed by the computer 1 of FIG. 1 or the light controller 41 of FIG. 2, for example. The embodiment of FIG. 11 is a variant on the embodiment of FIG. 3. In the embodiment of FIG. 9, steps 175, 177, and 181 are performed after step 109.

Like in the embodiment of FIG. 9, step 175 comprises detecting a response of the user to the visual distraction (in this embodiment, this visual distraction is rendered in step 109). Step 177 comprises checking whether a response has been detected in step 175, e.g., whether the user has looked at the selected further device. If no response has been detected, step 181 is performed. Step 181 comprises controlling the further device selected in step 107 to make the visual distraction more prominent, controlling a second further device of the plurality of further devices to render a further visual distraction, and/or causing an adjustment to a displaying of content on the display during the visual distraction.

Thus, if the system which performs the method detects that the user has not looked at the visual distraction, it could render the visual distraction on a different device or make the visual distraction more prominent. For example, if the further device selected in step 107 is a lighting device, the effect could be made more dynamic or contrasting, and/or another lighting devices could be controlled in parallel to make the visual distraction more visible. It may also be possible to use another or additional notification modality if the user has not responded to a visual distraction. For instance, the system may generate a notification sound or generate a tactile feedback on wearable or portable devices currently worn or held by the user.

The embodiments of FIGS. 3, 5 to 9, and 11 differ from each other in multiple aspects, i.e., multiple steps have been added or replaced. In variations on these embodiments, only a subset of these steps is added or replaced and/or one or more steps is omitted. As a first example, steps 103-107 may be performed before step 101 in the embodiments of FIGS. 3, 6-9, and 11 an after step 101 in the embodiment of FIG. 5. As a second example, one or more of the embodiments of FIGS. 6-9 and 11 may be combined.

Figure 12:
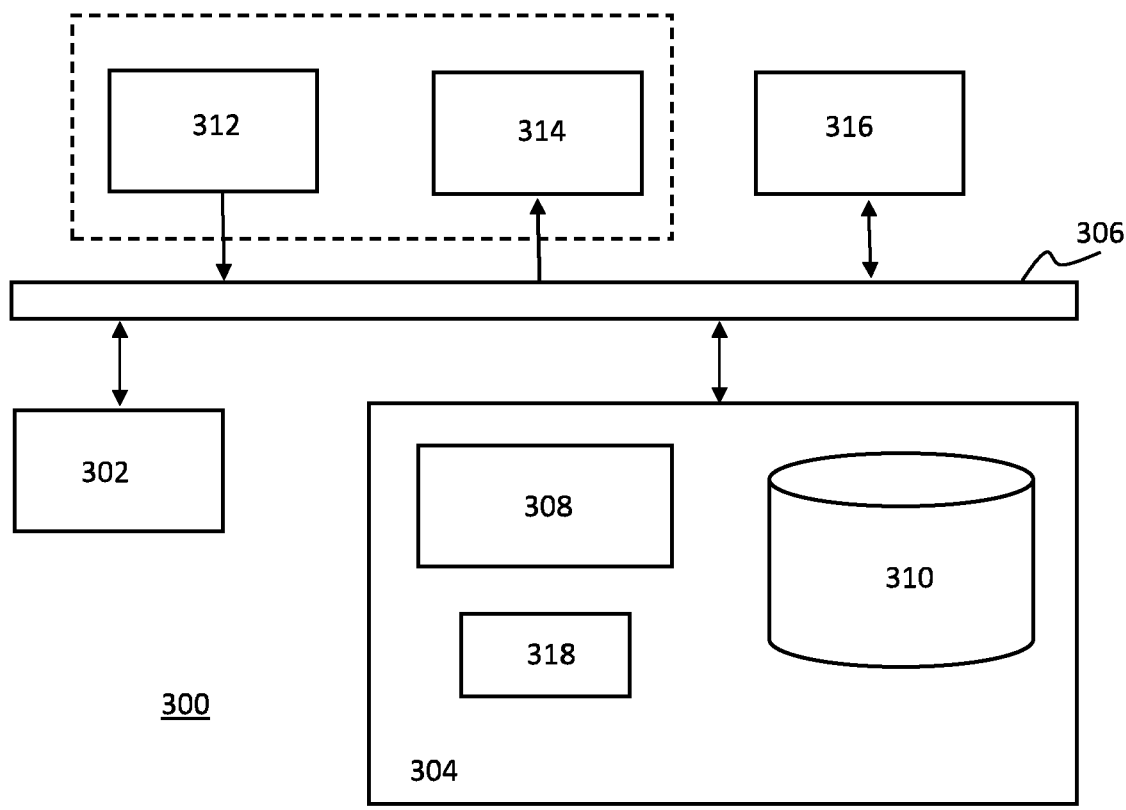
FIG. 12 is a block diagram of an exemplary data processing system for performing the method of the invention.

FIG. 12 depicts a block diagram illustrating an exemplary data processing system that may perform the method as described with reference to FIGS. 3, 5 to 9, and 11.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g., if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 12) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 12 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining how long a user has been looking at a display, said system comprising:
   at least one input interface;
   at least one transmitter; and
   at least one processor configured to:
      determine, via said at least one input interface, whether said user has been looking at said display longer than a defined period of time,
      obtain location information indicative of a location of a device having said display and locations of a plurality of further devices relative to said user, said plurality of further devices being located separate from said display,
      determine a first location of said device having said display based on said location information,
      determine second locations of said plurality of further devices based on said location information,
      select a further device from said plurality of further devices based on said first location and said second locations, and
      control, via said at least one transmitter, said selected further device to render a visual distraction when said user is determined to have been looking at said display longer than said predefined period of time;
   wherein said selected further device includes at least one of (i) a lighting device, (ii) a further display, or (iii) daylight blocking means.

2. The system as claimed in claim 1, wherein said at least one processor is configured to select said further device from said plurality of further devices by selecting a further device which has a location with at least a minimum distance to said first location, said location being included in said second locations.

3. The system as claimed in claim 1, wherein said at least one processor is configured to select said further device from said plurality of further devices by selecting a further device which has a location with a larger distance to said first location than other ones of said plurality of further devices, said location being included in said second locations.

4. The system as claimed in claim 1, wherein said at least one processor is configured to select said further device in dependence on said further device being in the field of view of said user or illuminating an object in the field of view of said user.

5. The system as claimed in claim 1, wherein said at least one processor is configured to determine a start time for rendering said visual distraction to coincide with a transition in content displayed on said display, with a time at which another system starts rendering an own visual distraction, with a time at which rendering said visual distraction would not distract another user, or with a detected event.

6. The system as claimed in claim 1, wherein said selected further device comprises said further display and said at least one processor is configured to control said selected further device to display, on said further display, a copy of content displayed on said display.

7. The system as claimed in claim 1 wherein said at least one processor is configured to cause said display to render an animation which moves in the direction of said selected further device.

8. The system as claimed in claim 1 wherein said at least one processor is configured to augment said visual distraction with an auditory effect and/or a haptic effect.

9. The system as claimed in claim 1 wherein said at least one processor is configured to cause an adjustment to a displaying of content on said display during said visual distraction by causing said displaying to be stopped or paused or slowed, and/or by causing said content to be displayed with a reduced brightness.

10. The system as claimed in claim 1 wherein said at least one processor is configured to determine for each of said plurality of devices whether rendering said visual distraction would be visible to another user and select said further device from said plurality of further devices based on said determined visibility to another user.

11. The system as claimed in claim 1 wherein said at least one processor is configured to detect a response of said user to said visual distraction and if no response is detected, control said selected further device to make said visual distraction more prominent, control a second further device of said plurality of further devices to render a further visual distraction, and/or cause an adjustment to a displaying of content on said display during said visual distraction.

12. The system as claimed in claim 1 wherein said at least one processor is configured to determine whether said user has been looking at said display longer than said predefined period of time by determining whether said user has gazed at said display longer than said predefined period of time, has held the same posture longer than said predefined period of time, and/or has interacted with a system displaying content on said display longer than said predefined period of time.

13. A method of determining how long a user has been looking at a display, said method comprising:
   determining when said user has been looking at said display longer than a predefined period of time;
   obtaining location information indicative of a location of a device having said display and locations of a plurality of further devices relative to said user, said plurality of further devices being located separate from said display;
   determining a first location of said device having said display based on said location information;
   determining second locations of a plurality of further devices based on said location information;
   selecting a further device from said plurality of further devices based on said first location and said second locations; and
   controlling said selected further device to render a visual distraction if said user is determined to have been looking at said display longer than said predefined period of time;
   wherein said selected further device includes at least one of (i) a lighting device, (ii) a further display, or (iii) daylight blocking means.

14. A non-transitory computer program product comprising computer program code to perform the method of claim 13 when run on a processor.

* * * * *